United States Patent
Toyota et al.

(10) Patent No.: US 10,035,411 B2
(45) Date of Patent: Jul. 31, 2018

(54) SOUND INSULATION MEMBER AND VEHICULAR DOOR STRUCTURE

(71) Applicants: TOYOTA JIDOSHA KABUSHIKI KAISHA, Toyota-shi, Aichi-ken (JP); VTEC CO., LTD., Anjo-shi, Aichi (JP); NIFCO INC., Yokosuka-shi, Kanagawa (JP)

(72) Inventors: Masaru Toyota, Toyota (JP); Susumu Ootsuka, Handa (JP); Kouji Suzuki, Nishio (JP); Yasuaki Kawakami, Toyota (JP); Yuichiro Inayoshi, Toyota (JP)

(73) Assignees: TOYOTA JIDOSHA KABUSHIKI KAISHA, Toyota (JP); VTEC CO., LTD., Anjo-shi (JP); NIFCO, INC., Yokosuka-shi (JP)

( * ) Notice: Subject to any disclaimer, the term of this patent is extended or adjusted under 35 U.S.C. 154(b) by 0 days.

(21) Appl. No.: 15/100,118

(22) PCT Filed: Nov. 5, 2014

(86) PCT No.: PCT/JP2014/079372
§ 371 (c)(1),
(2) Date: May 27, 2016

(87) PCT Pub. No.: WO2015/079878
PCT Pub. Date: Jun. 4, 2015

(65) Prior Publication Data
US 2017/0057334 A1    Mar. 2, 2017

(30) Foreign Application Priority Data
Nov. 28, 2013 (JP) .................. 2013-246610

(51) Int. Cl.
*B60J 10/50* (2016.01)
*B60J 5/04* (2006.01)
(Continued)

(52) U.S. Cl.
CPC ............. *B60J 10/50* (2016.02); *B60J 5/0411* (2013.01); *B60J 5/0418* (2013.01); *B60J 10/40* (2016.02); *B60J 10/75* (2016.02)

(58) Field of Classification Search
CPC ........ B60J 5/0411; B60J 5/0418; B60J 10/50; B60J 10/75
(Continued)

(56) References Cited

U.S. PATENT DOCUMENTS 3,742,649 A * 7/1973 Dochnahl ................ B60J 10/75
49/441
4,817,336 A * 4/1989 Kisanuki .................. B60J 10/75
296/154
(Continued)

FOREIGN PATENT DOCUMENTS

EP    1669246 A2    6/2006
JP    S53-153624 U  12/1978
(Continued)

OTHER PUBLICATIONS

Oct. 26, 2016 Search Report issued in European Patent Application No. 14865629.1.
(Continued)

*Primary Examiner* — Katherine W Mitchell
*Assistant Examiner* — Catherine A Kelly
(74) *Attorney, Agent, or Firm* — Oliff PLC

(57) ABSTRACT

A sound insulation member has a fitting portion and a sealing portion. The fitting portion is attached to at least one of a door front-side end portion and a door rear-side end portion of an inner weather strip that is disposed at an upper
(Continued)

portion of a door inner panel, and is fitted into the inner weather strip. The sealing portion fills a gap between the inner weather strip and the door inner panel.

4 Claims, 10 Drawing Sheets

(51) Int. Cl.
*B60J 10/40* (2016.01)
*B60J 10/75* (2016.01)

(58) Field of Classification Search
USPC .................................................. 49/377
See application file for complete search history.

(56) References Cited

U.S. PATENT DOCUMENTS

| | | | | |
|---|---|---|---|---|
| 4,894,954 | A * | 1/1990 | Nozaki | B60J 10/235 49/373 |
| 4,956,941 | A * | 9/1990 | Vaughan | B60R 1/06 49/440 |
| 5,353,549 | A * | 10/1994 | Henderson | B60J 10/75 49/377 |
| 5,524,388 | A * | 6/1996 | Chowdhury | B60J 1/17 49/374 |
| 5,636,895 | A * | 6/1997 | Ito | B60J 10/80 296/146.9 |
| 5,815,985 | A * | 10/1998 | Nishida | B60J 1/16 49/377 |
| 6,401,394 | B2 * | 6/2002 | Nozaki | B60J 10/18 49/377 |
| 6,502,832 | B2 * | 1/2003 | Goto | F16J 15/025 277/642 |
| 6,748,702 | B2 * | 6/2004 | Jang | B60J 10/00 428/131 |
| 7,390,050 | B2 * | 6/2008 | Nakao | B60R 13/04 296/146.1 |
| 7,425,032 | B2 * | 9/2008 | Morikawa | B60J 10/78 296/146.1 |
| 7,484,287 | B2 * | 2/2009 | Tamura | B23P 19/047 29/451 |
| 8,001,727 | B2 * | 8/2011 | Ho | B29C 45/14467 49/374 |
| 8,506,143 | B2 * | 8/2013 | Sugiura | B60J 5/0411 362/501 |
| 8,572,897 | B2 * | 11/2013 | Dishman | B60J 10/21 49/377 |
| 8,714,624 | B2 * | 5/2014 | Fukui | B60R 13/04 296/146.1 |
| 8,758,872 | B2 * | 6/2014 | Mutoh | B60J 10/75 428/122 |
| 8,882,186 | B2 * | 11/2014 | Matsumoto | B60J 10/081 296/146.9 |
| 9,038,318 | B2 * | 5/2015 | Jendrossek | B60J 10/041 49/377 |
| 9,211,781 | B2 * | 12/2015 | Saiki | B60R 13/04 |
| 9,248,729 | B2 * | 2/2016 | Yi | B60J 10/041 |
| 2015/0251529 | A1 * | 9/2015 | Ide | B60J 10/0094 49/476.1 |
| 2016/0355076 | A1 * | 12/2016 | Suzuki | B60J 5/0418 |

FOREIGN PATENT DOCUMENTS

| | | |
|---|---|---|
| JP | H02-69529 U | 5/1990 |
| JP | 2000-203270 A | 7/2000 |
| JP | 2001-219738 A | 8/2001 |
| JP | 2003-200737 A | 7/2003 |
| JP | 2004-224198 A | 8/2004 |
| JP | 2005-297794 A | 10/2005 |
| JP | 2014-073774 A | 4/2014 |

OTHER PUBLICATIONS

Partial translation dated Sep. 1, 2015 Office Action issued in Japanese Patent Application No. 2013-246610.

* cited by examiner

SOUND INSULATION MEMBER AND VEHICULAR DOOR STRUCTURE

TECHNICAL FIELD

The invention relates to a sound insulation member and a vehicular door structure.

BACKGROUND ART

As a sound insulation member that insulates the sound between a door panel and a door glass of a vehicle, a sound insulation structure that is equipped with protrusions at a lower end portion of a sealing portion (a weather strip) that is attached to the door panel is disclosed in Japanese Patent Application Publication No. 2001-219738 (JP 2001-219738 A). It should be noted herein that the sound is insulated by providing the door glass with sound insulation members, and elastically bringing the sound insulation members into contact with the protrusions with the door glass closed.

SUMMARY OF THE INVENTION

Problem to Be Solved by the Invention

However, the door glass needs to be provided with a large number of sound insulation members, so there is a room for improvement from the standpoint of the assembling man-hour.

In view of the above, it is an object of the invention to provide a sound insulation member and a vehicular door structure that make it possible to reduce the assembling man-hour.

Means for Solving the Problem

A sound insulation member according to a first aspect of the invention has a fitting portion and a sealing portion. The fitting portion is attached to at least one of a door front-side end portion and a door rear-side end portion of an inner weather strip that is disposed at an upper portion of a door inner panel, and is fitted into the inner weather strip. The sealing portion fills a gap between the inner weather strip and the door inner panel.

The sound insulation member according to the first aspect of the invention is provided with the fitting portion that is fitted into the inner weather strip. Therefore, the inner weather strip and the sound insulation member, which are fitted to each other by attaching the sound insulation member to at least one of the door front-side end portion and the door rear-side end portion of the inner weather strip, can be assembled with the door inner panel. Thus, the assembling man-hour can be reduced. Besides, the sound insulation member is provided with the sealing portion that fills the gap between the inner weather strip and the door inner panel. Therefore, the road noise and wind noise in the door inner panel can be insulated.

A sound insulation member according to a second aspect of the invention is the sound insulation member set forth in the first aspect of the invention that is configured such that the fitting portion is provided with a covering portion that covers a door lower side of the inner weather strip.

In accordance with the sound insulation member according to the second aspect of the invention, even in the case where a gap is created between the inner weather strip and the fitting portion of the sound insulation member, the covering portion covers the door lower side of the inner weather strip, so sound insulating properties can be ensured.

A sound insulation member according to a third aspect of the invention is the sound insulation member set forth in the first or second aspect of the invention that is configured such that the sealing portion is equipped with a sealing lip that is elastically pressed into contact with an opening edge portion of the door inner panel.

In accordance with the sound insulation member according to the third aspect of the invention, the difference in shape of the opening edge portion of the door inner panel can be permitted through elastic deformation of the sealing lip. Thus, even in the case where the sound insulation member is assembled with a plurality of kinds of vehicles, sound insulating properties can be ensured by filling the gap between the inner weather strip and the door inner panel.

A sound insulation member according to a fourth aspect of the invention is the sound insulation member set forth in any one of the first to third aspects of the invention that is configured to be equipped with a tubular damping portion that is surrounded by lateral walls and a bottom wall.

In accordance with the sound insulation member according to the fourth aspect of the invention, in the case where noise enters from the gap between the inner weather strip and the door inner panel, the noise can be damped.

A vehicular door structure according to a fifth aspect of the invention has a door inner panel of a vehicle, an inner weather strip that is disposed at an upper portion of the door inner panel, and the sound insulation member set forth in any one of the first to fourth aspects of the invention that is fitted to a door front-side end portion or a door rear-side end portion of the inner weather strip.

In accordance with the vehicular door structure according to the fifth embodiment of the invention, the sound insulation member set forth in any one of the first to fourth aspects of the invention is provided. Therefore, an operation and an effect as described previously are achieved.

Effect of the Invention

As described above, the sound insulation member and the vehicular door structure according to the invention have an excellent effect of making it possible to reduce the assembling man-hour.

MODES FOR CARRYING OUT THE INVENTION

<First Embodiment>

Figure 1:
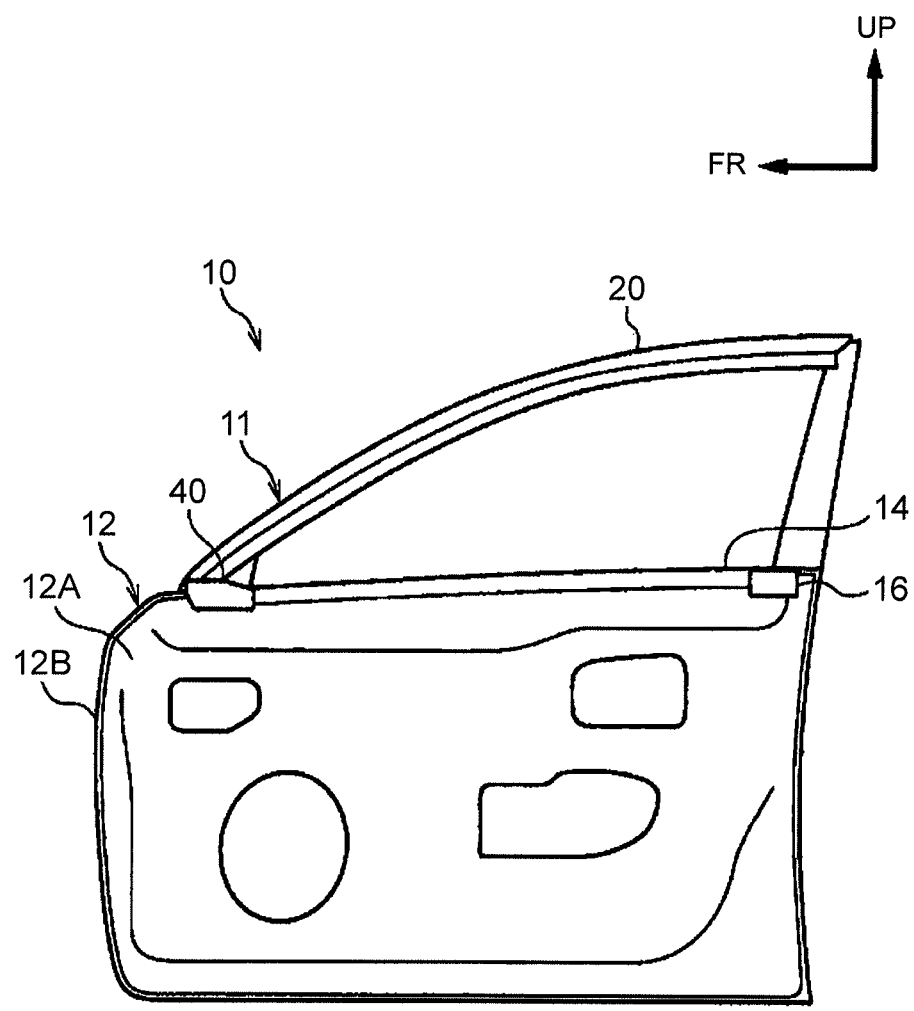
FIG. 1 is a lateral view showing a vehicular door structure that is equipped with a sound insulation member according to a first embodiment of the invention, as viewed from inside in a thickness direction of a door.

A sound insulation member 16 and a vehicular door structure 10 according to the first embodiment of the invention will be described hereinafter, using FIGS. 1 to 4.

Incidentally, arrows UP, FR and IN, which are appropriately shown in the drawings, denote an upward direction with respect to a door, a forward direction with respect to the door, and an inward direction with respect to the thickness of the door. Besides, when upward/downward directions, forward/backward directions and inward/outward directions are mentioned in the following description without being otherwise specified, they are meant to indicate the upward/downward directions with respect to a vertical direction of the door, the forward/backward directions with respect to a longitudinal direction of the door, and the inward/outward directions with respect to a thickness direction of the door, respectively.

(Vehicular Door Structure)

As shown in FIG. 1, the vehicular door structure 10 according to the present embodiment of the invention is mainly equipped with a door panel 12 of a front side door 11, an inner weather strip 14 that is disposed at an upper portion of the door panel 12, a sound insulation member 40 that is attached to a door front-side end portion of the inner weather strip 14, and a sound insulation member 16 that is attached to a door rear-side end portion of the inner weather strip 14.

Incidentally, it is sufficient that the sound insulation member 16 or the sound insulation member 40 be attached to at least one of the door front-side end portion and the door rear-side end portion of the inner weather strip 14. For example, the door structure 10 may have only the sound insulation member 16 attached to at least one of the end portions of the inner weather strip 14. Besides, in the present embodiment of the invention, the sound insulation member 16 that is attached to the door rear-side end portion of the inner weather strip 14 will be described. The sound insulation member 40 that is attached to the door front-side end portion of the inner weather strip 14 will be described in the second embodiment of the invention.

The door panel 12 that constitutes the vehicular door structure 10 is equipped with a metallic door inner panel 12A that is provided inside in the thickness direction of the door, and a metallic door outer panel 12B that is provided outside in the thickness direction of the door. Besides, a metallic door frame 20 that is formed in the shape of a frame is provided at an upper portion of the door inner panel 12A.

It should be noted herein that the inner weather strip 14 is disposed at the upper portion of the door inner panel 12A. Besides, an outer weather strip (not shown) is disposed at an upper portion of the door outer panel 12B. The inner weather strip 14 is disposed along the door inner panel 12A on a door belt line from a door front-side end portion of the door inner panel 12A to a door rear-side end portion of the door inner panel 12A. More specifically, the inner weather strip 14 is fitted into and assembled with a flange at an upper end portion of the door inner panel 12A.

Figure 2:
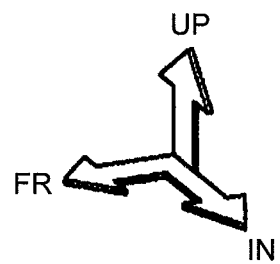
FIG. 2 is a perspective view showing a state where the sound insulation member according to the first embodiment of the invention is assembled with a front side door.
Figure 2:
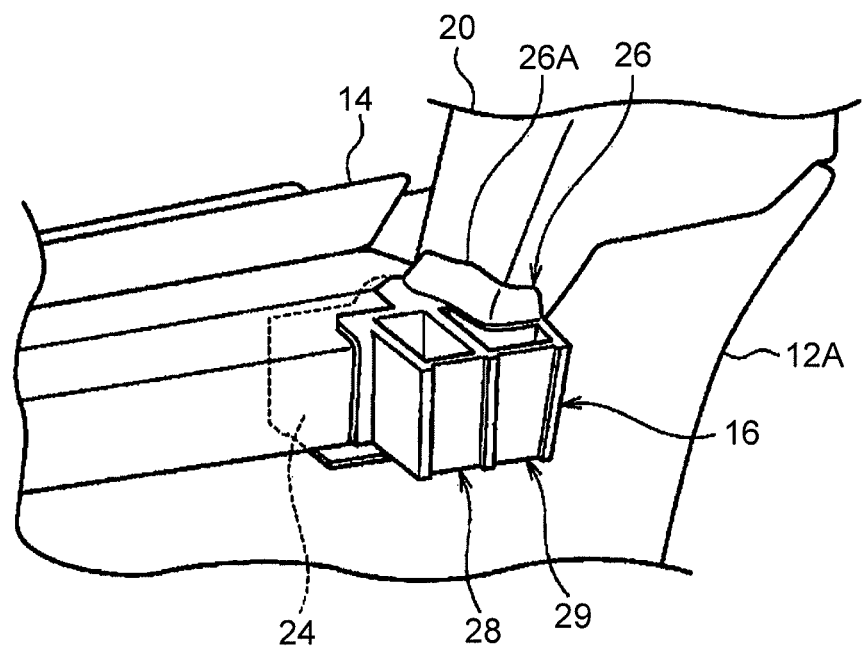

As shown in FIG. 2, the sound insulation member 16 is attached to the door rear-side end portion of the inner weather strip 14. The sound insulation member 16 is a resinous blockish part, and is fitted into and assembled with the flange at the upper end portion of the door inner panel 12A as is the case with the inner weather strip 14. The sound insulation member 16 is mainly equipped with a fitting portion 24, a sealing portion 26, a damping portion 28 and a damping portion 29. Incidentally, in the present embodiment of the invention, for instance, the sound insulation member 16 is formed of a synthetic rubber such as olefinic elastomer (TPO), ethylene-propylene-diene rubber (EPDM) or the like, but the invention is not limited thereto. The sound insulation member 16 may be formed of other resin materials. The same holds true for the second to fourth embodiments of the invention.

Figure 3:
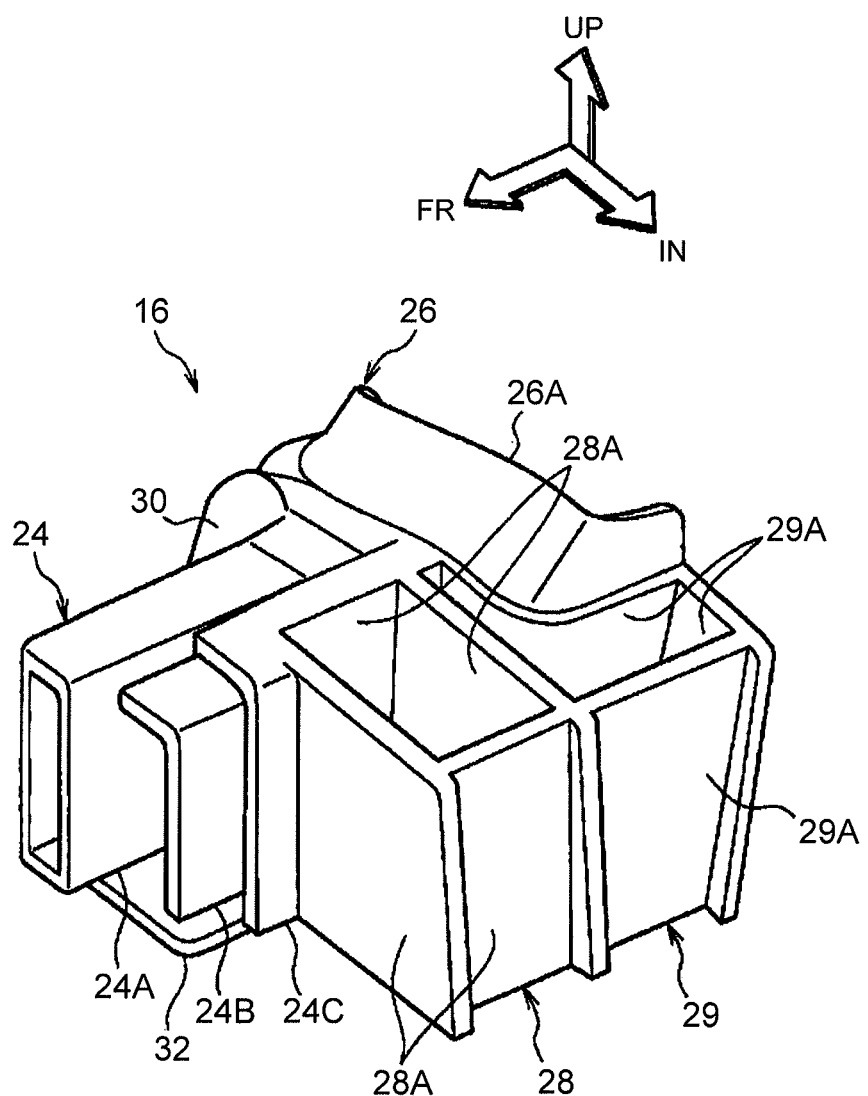
FIG. 3 is a perspective view showing the sound insulation member according to the first embodiment of the invention.
Figure 4:
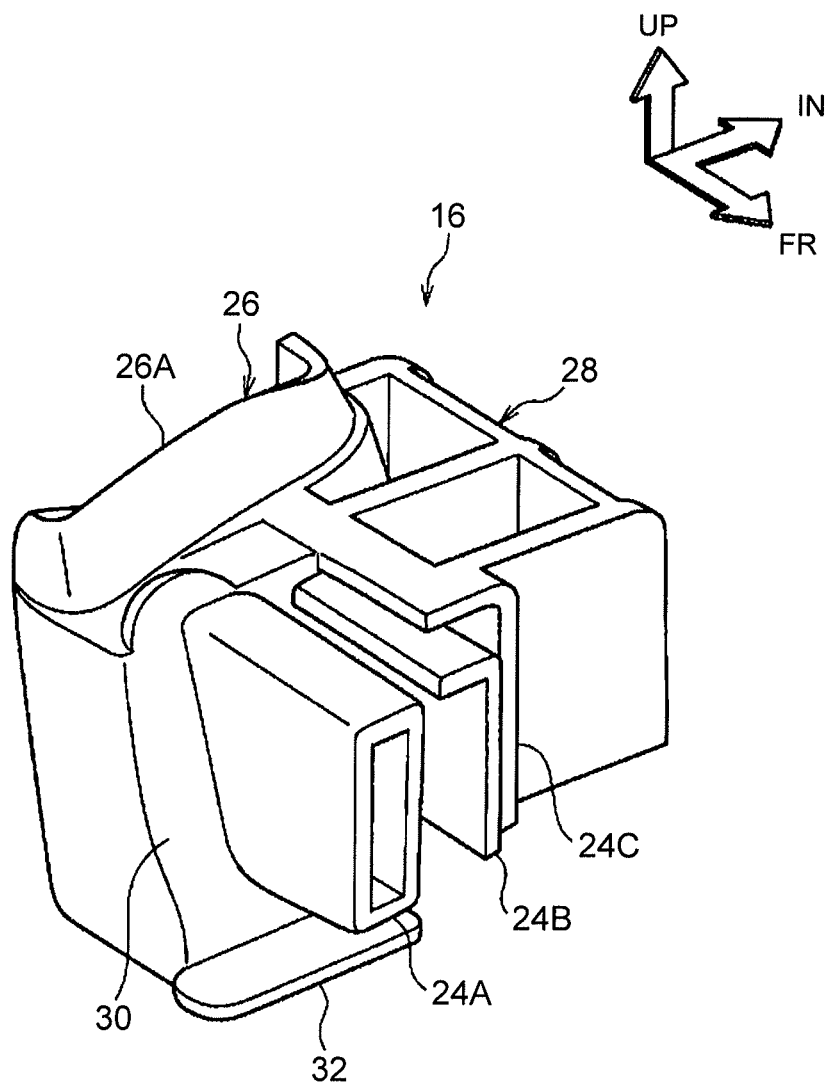
FIG. 4 is a perspective view of the sound insulation member according to the first embodiment of the invention, as viewed from a different angle.

As shown in FIG. 3, the fitting portion 24 is provided at a region of the sound insulation member 16 to which the inner weather strip 14 is attached (a region that is located on the door front side). As shown in FIG. 4, the fitting portion 24 is equipped with an inclined surface 30. The end portion of the inner weather strip 14 is placed against the inclined surface 30 to abut thereon. Besides, a plurality of protrusions 24A, 24B and 24C protrude forward with respect to the door from the inclined surface 30. The fitting portion 24 assumes a convexo-concave shape corresponding to the shape of the end portion of the inner weather strip 14. It should be noted herein that the protrusion 24A, the protrusion 24B and the protrusion 24C are arranged apart from one another in the thickness direction of the door. The protrusion 24A, which is located outside in the thickness direction of the door, is formed in the shape of a tube that is open on a tip side thereof. Besides, the protrusion 24B, which is located at a center in the thickness direction of the door, and the protrusion 24C, which is located inside in the thickness direction of the door, are formed substantially in the shape of the vertically inverted letter "L". Incidentally, the invention is not limited to this configuration. The shape of the fitting portion 24 may be set in accordance with the shape of the end portion of the inner weather strip 14. The number of protrusions may be changed, and the shape of the protrusions may be changed.

A covering portion 32 that covers a door lower side of the inner weather strip 14 is formed at the fitting portion 24. The covering portion 32 is a plate-like region that extends forward with respect to the door from a lower end portion of the fitting portion 24. The covering portion 32 is configured to enter a gap between the door inner panel 12A and the inner weather strip 14 when the sound insulation member 16 is attached to the inner weather strip 14.

The sealing portion 26 is provided at a region that is located behind the fitting portion 24 with respect to the door. The sealing portion 26 is arranged between the door rear-side end portion of the inner weather strip 14 and a lower end portion of the door frame 20 when the sound insulation member 16 is attached to the inner weather strip 14. Also, the sealing portion 26 is configured to seal a gap between the inner weather strip 14 and the door inner panel 12A (see FIG. 2). Besides, a sealing lip 26A is provided at a door rear-side end portion of the sealing portion 26. The sealing lip 26A is elastically deformably formed. As shown in FIG.

2, the sealing lip 26A is elastically pressed into contact with and seals the door frame 20 at an opening edge portion of the door inner panel 12A.

As shown in FIG. 3, the damping portion 28 and the damping portion 29 are provided at a region that is located inside the sealing portion 26 in the thickness direction of the door. The damping portion 28 is formed in the shape of a tube by two pairs of opposed lateral walls 28A and a bottom wall (not shown), and constitutes a space that substantially assumes the shape of a rectangular parallelepiped. Besides, the damping portion 29 is provided behind the damping portion 28 with respect to the door. The damping portion 29 is formed in the shape of a tube by the lateral wall 28A that is common to the damping portion 28, three lateral walls 29A and a bottom wall (not shown). It should be noted herein that one of the lateral walls 29A constituting the damping portion 29 is curved along the contour of the sealing lip 26A, and constitutes a space that assumes the shape of a partially inwardly crushed rectangular parallelepiped.

Incidentally, it is sufficient that the damping portion 28 and the damping portion 29 be formed in the shape of a tube by lateral walls and a bottom wall. The damping portion 28 and the damping portion 29 may be formed in other shapes. For example, the damping portion 28 and the damping portion 29 may be formed substantially in the shape of a triangle in a plan view. Besides, although the two damping portions are formed in the present embodiment of the invention, the invention is not limited thereto. Three or more damping portions may be formed. On the contrary, only one damping portion may be formed.

(Operation and Effect)

Next, the operation and effect of the sound insulation member 16 and the vehicular door structure 10 of the present embodiment of the invention will be described. According to the vehicular door structure 10 of the present embodiment of the invention, as shown in FIG. 2, the inner weather strip 14 and the sound insulation member 16 can be assembled with the door inner panel 12A with the door rear-side end portion of the inner weather strip 14 and the fitting portion 24 of the sound insulation member 16 fitted to each other. Thus, the assembling man-hour can be reduced in comparison with the case where the inner weather strip 14 and the sound insulation member 16 are assembled with the door inner panel 12A in separate processes. Incidentally, the invention is not limited to this configuration. The inner weather strip 14 may be assembled with the door inner panel 12A with the sound insulation member 16 assembled with the upper end portion of the door inner panel 12A in advance.

Besides, the gap between the inner weather strip 14 and the door inner panel 12A can be filled by the sealing portion 26 that is provided on the sound insulation member 16. Therefore, sound insulating properties can be ensured without filling the gap with a sponge or the like.

Besides, sound insulating properties can be obtained by attaching the sound insulation member 16 to at least one of the door front-side end portion and the door rear-side end portion of the inner weather strip 14. Therefore, the number of parts can be reduced in comparison with the case where a large number of sound insulation materials are provided on a door glass. Furthermore, the trouble of attaching the sound insulation member to the door glass can be saved, so the cost can be reduced.

Besides, the covering portion 32, which is provided at the lower end portion of the fitting portion 24, has entered the gap between the door inner panel 12A and the inner weather strip 14. Therefore, even in the case where a gap is created between the inner weather strip 14 and the fitting portion 24, the covering portion 32 covers the door lower side of the inner weather strip 14, and sound insulating properties can thereby be ensured.

Besides, the sealing portion 26 of the sound insulation member 16 of the present embodiment of the invention is provided with the sealing lip 26A. Therefore, even in the case where the sound insulation member 16 is applied to a vehicle with the door inner panel 12A or the door frame 20 that assumes a different shape, the sealing lip is elastically deformed, is pressed into contact with the opening edge portion of the door inner panel 12A, and seals the gap. Thus, sound insulating properties can be ensured. Besides, the road noise and wind noise that have entered from the gap between the inner weather strip 14 and the door inner panel 12A can be damped by the damping portion 28 and the damping portion 29.

<Second Embodiment>

Figure 5:
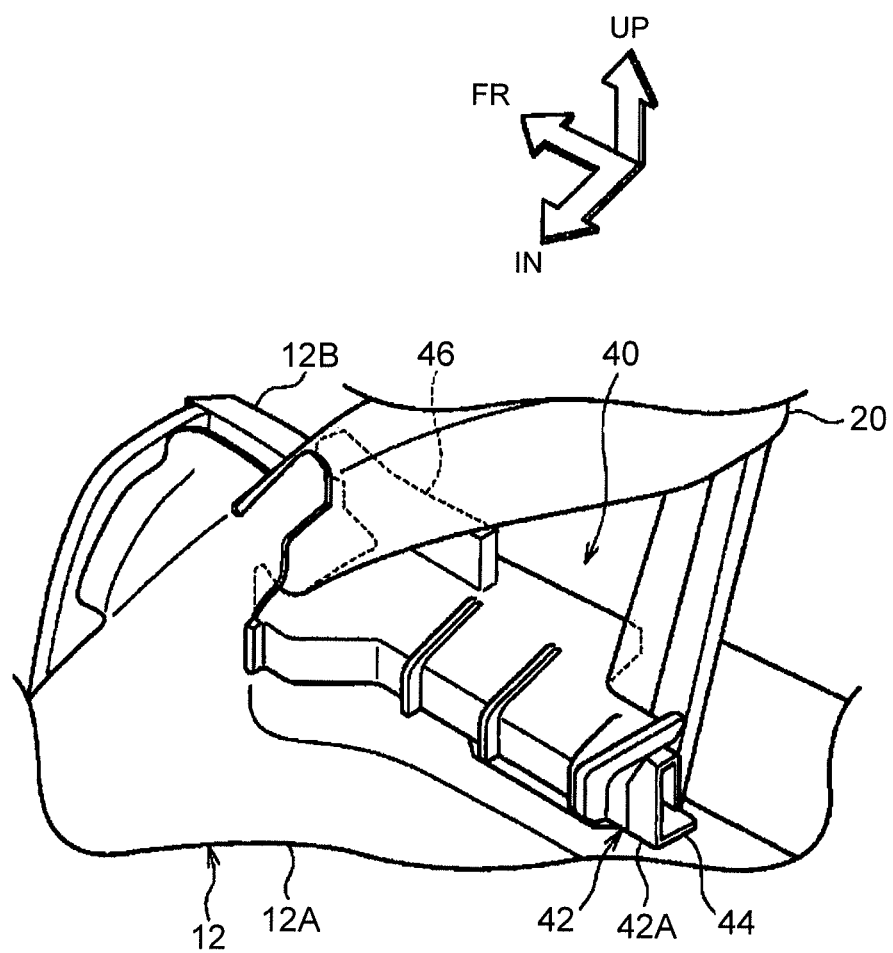
FIG. 5 is a perspective view showing a state where a sound insulation member according to a second embodiment of the invention is assembled with a front side door.
Figure 6:
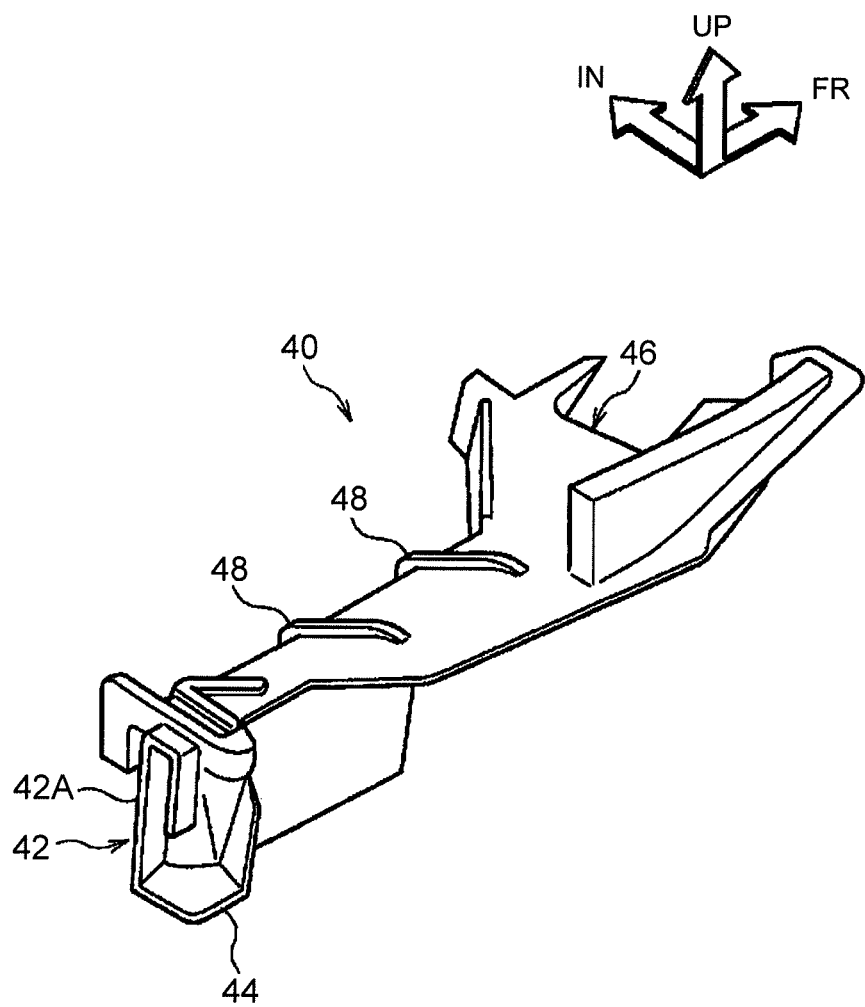
FIG. 6 is a perspective view showing the sound insulation member according to the second embodiment of the invention.

Next, the sound insulation member 40 according to the second embodiment of the invention will be described, using FIGS. 5 and 6. As shown in FIG. 5, the sound insulation member 40 of the present embodiment of the invention is attached to the door front-side end portion of the door inner panel 12A, and is mainly equipped with a fitting portion 42 and a sealing portion 46. Incidentally, for the sake of convenience of explanation, the weather strip is not shown in FIG. 5. However, the inner weather strip is disposed at the upper portion of the door inner panel 12A. The sound insulation member 40 is attached to this inner weather strip.

The fitting portion 42 is provided at a door rear-side end portion of the sound insulation member 40. As shown in FIG. 6, the fitting portion 42 is formed in a convexo-concave shape corresponding to the shape of the end portion of the inner weather strip. Besides, the fitting portion 42 is provided with a protrusion 42A, and is configured such that this protrusion 42A enters the inner weather strip to be fitted thereto. Besides, a plate-like covering portion 44 extends backward with respect to the door from a lower end portion of the fitting portion 42. The covering portion 44 is configured to enter a gap between the door inner panel 12A and the inner weather strip when the sound insulation member 40 is attached to the inner weather strip.

The sealing portion 46 is provided at a region on the opposite side of the fitting portion 42. The sealing portion 46 is arranged between the door front-side end portion of the inner weather strip and the lower end portion of the door frame 20 when the sound insulation member 40 is attached to the inner weather strip. Also, the sealing portion 46 is configured to seal the gap between the inner weather strip and the door inner panel 12A. Besides, two reinforcement ribs 48 that reinforce the sound insulation member 40 are provided between the fitting portion 42 and the sealing portion 46.

According to the sound insulation member 40 of the present embodiment of the invention, an operation and an effect that are similar to those of the sound insulation member 16 of the first embodiment of the invention are achieved. In particular, as shown in FIG. 1, the sound insulation member 40 is attached to the door front side of the inner weather strip 14, and the sound insulation member 16 is attached to the door rear-side end portion of the inner weather strip 14. Sound insulating properties can thereby be enhanced in comparison with the case where the sound insulation member is attached to only one of the end portions of the weather strip 14. Incidentally, the sound insulation member 40 of the present embodiment of the invention is not equipped with the damping portion 28 as in the case of the sound insulation member 16 of the first embodiment of the invention. However, the sound insulation member 40 may be provided with a damping portion in order to obtain a damping effect.

<Third Embodiment>

Next, a sound insulation member 60 according to the third embodiment of the invention will be described, using FIGS. 7 and 8. Incidentally, in the following third and fourth embodiments of the invention, a sound insulation member that is attached to a weather strip on a rear side door side will be described.

Figure 7:
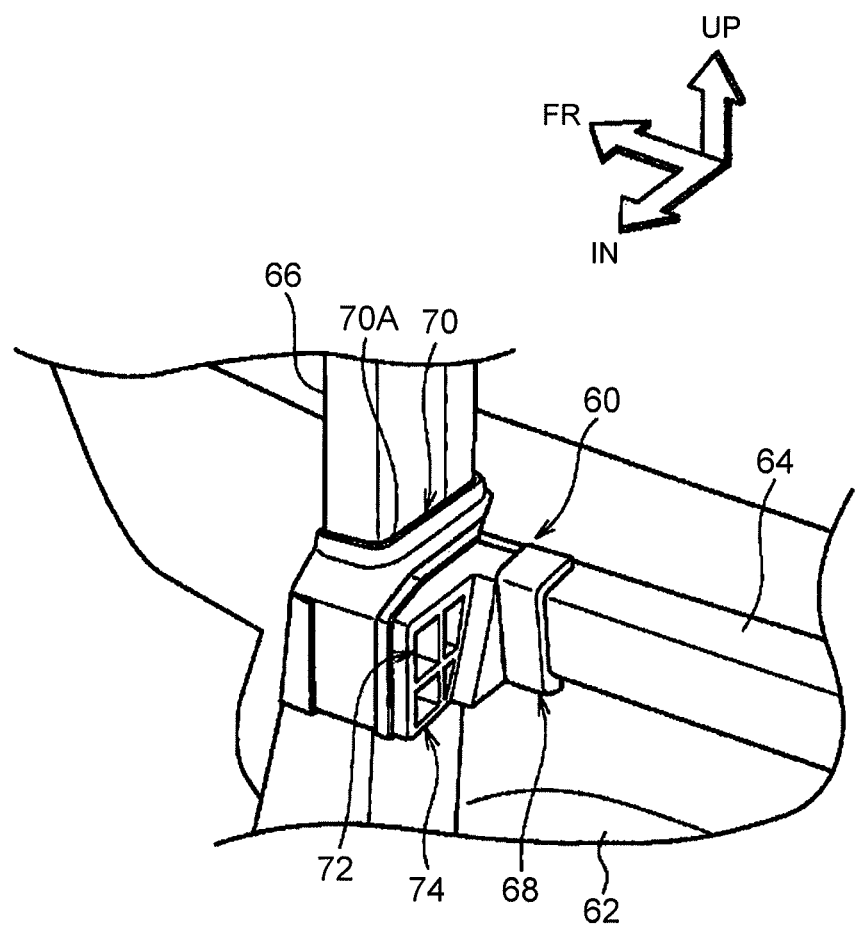
FIG. 7 is a perspective view showing a state where a sound insulation member according to a third embodiment of the invention is assembled with a rear side door.

As shown in FIG. 7, an inner weather strip 64 is disposed at an upper portion of a door inner panel 62 of a rear side door. The resinous blockish sound insulation member 60 is attached to a door front-side end portion of this inner weather strip 64. The sound insulation member 60 is mainly equipped with a fitting portion 68, a sealing portion 70, a damping portion 72 and a damping portion 74. A door front-side end portion of the sound insulation member 60 abuts on a rear door frame 66.

Figure 8:
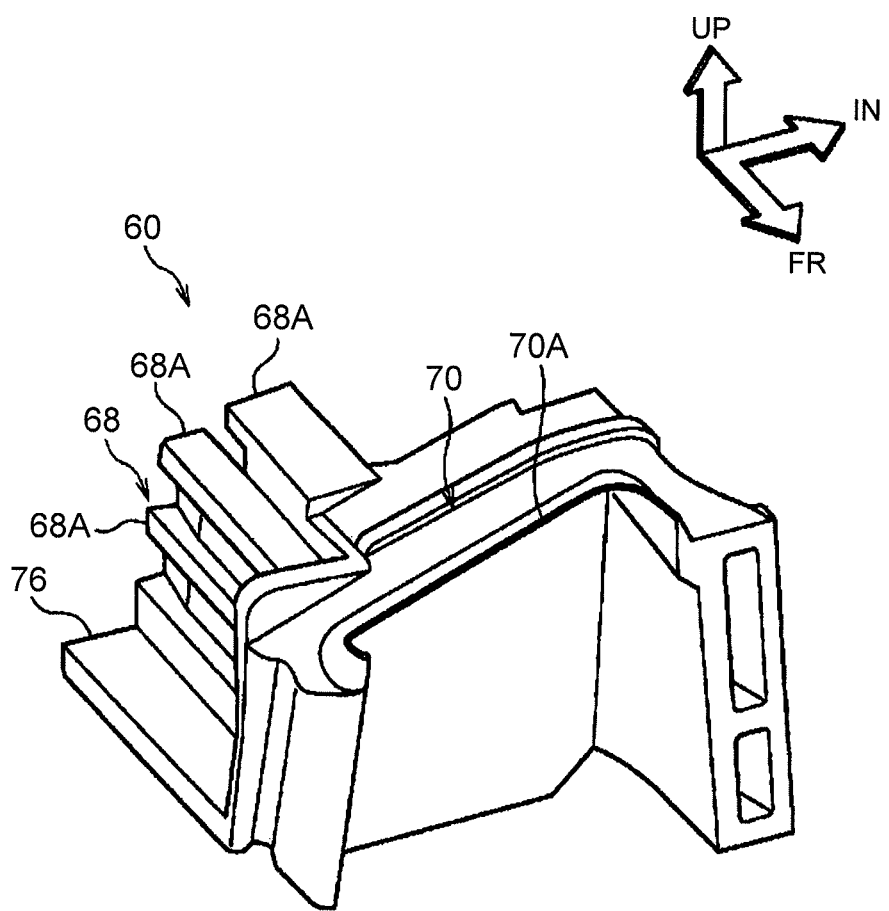
FIG. 8 is a perspective view showing the sound insulation member according to the third embodiment of the invention.

As shown in FIG. 8, the fitting portion 68 is formed in a convexo-concave shape by a plurality of protrusions 68A, and is configured to be fitted to the end portion of the inner weather strip 64. Besides, a plate-like covering portion 76 that extends forward with respect to the door is provided at a lower end portion of the fitting portion 68. Also, the covering portion 76 is configured to enter a gap between the door inner panel 62 and the inner weather strip 64 when the sound insulation member 60 is attached to the inner weather strip 64.

The sealing portion 70 is provided at a region on the opposite side of the fitting portion 68. The sealing portion 70 is arranged between the door front-side end portion of the inner weather strip 64 and the rear door frame 66 when the sound insulation member 60 is attached to the weather strip. Also, the sealing portion 70 is configured to seal the gap between the inner weather strip 64 and the door inner panel 62. Besides, the sealing portion 70 is provided with an elastically deformable sealing lip 70A. This sealing lip 70A is in contact with the rear door frame 66 to seal the sound insulation member 60 and the rear door frame 66.

As shown in FIG. 7, the damping portion 72 and the damping portion 74 are provided inside the fitting portion 68 in the thickness direction of the door. The damping portion 72 and the damping portion 74 constitute a space that substantially assumes the shape of a rectangular parallelepiped, as is the case with the damping portion 28 of the first embodiment of the invention.

According to the sound insulation member 60 of the present embodiment of the invention, an operation and an effect that are similar to those of the sound insulation member 16 of the first embodiment of the invention are achieved.

<Fourth Embodiment>

Figure 9:
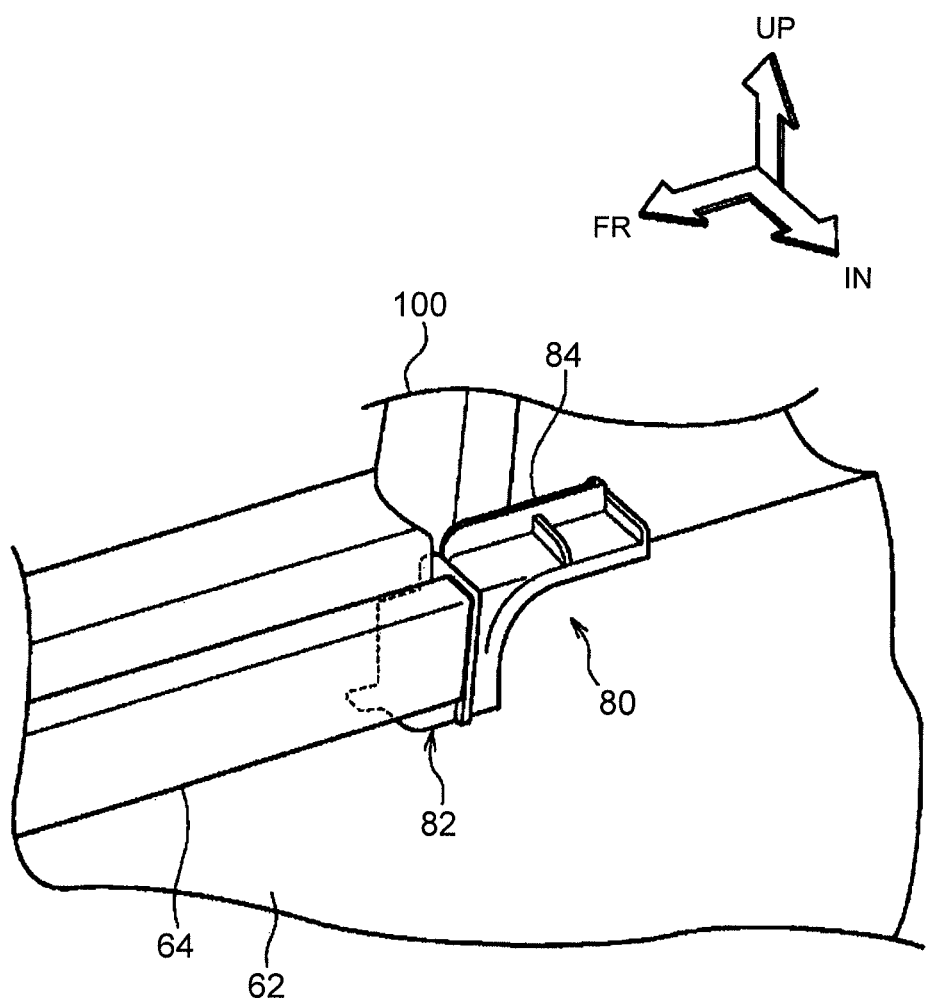
FIG. 9 is a perspective view showing a state where a sound insulation member according to a fourth embodiment of the invention is assembled with a rear side door.

Next, a sound insulation member 80 according to the fourth embodiment of the invention will be described, using FIGS. 9 and 10. As shown in FIG. 9, the inner weather strip 64 is disposed at the upper portion of the door inner panel 62 of the rear side door. The resinous blockish sound insulation member 80 is attached to a door-side end portion of this inner weather strip 64. The sound insulation member 80 is mainly equipped with a fitting portion 82, a sealing portion 84, a damping portion 88 and a damping portion 90. A door rear-side end portion of the sound insulation member 80 abuts on a division bar 100.

Figure 10:
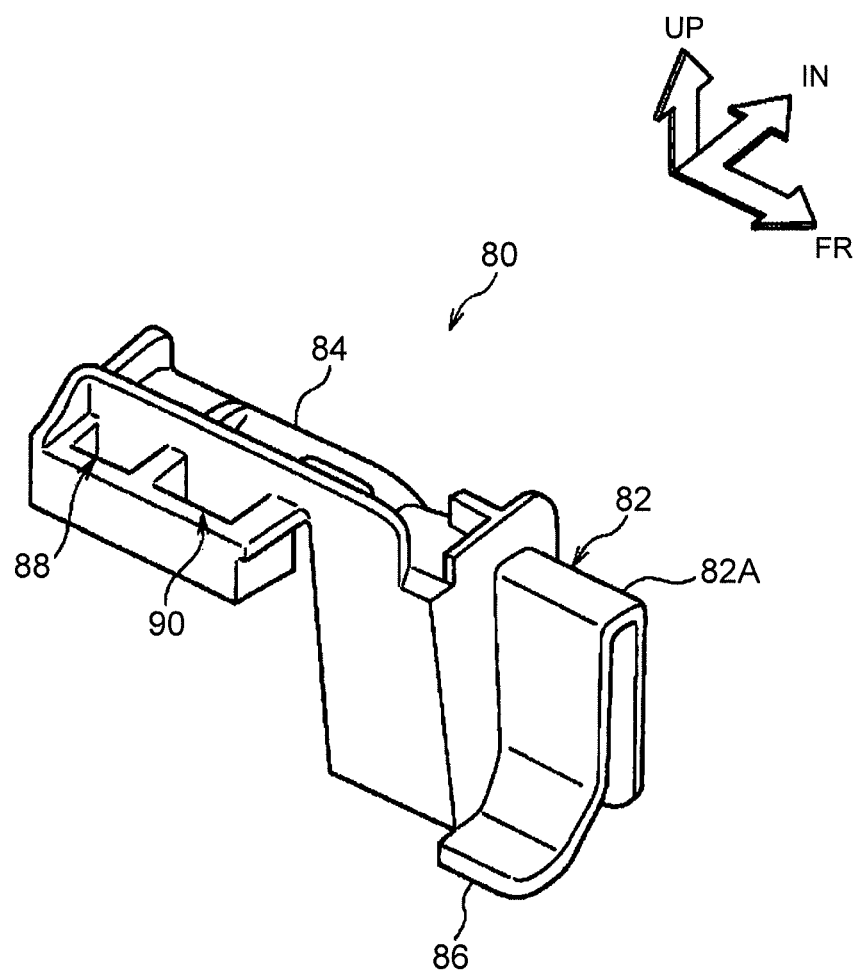
FIG. 10 is a perspective view showing the sound insulation member according to the fourth embodiment of the invention.

As shown in FIG. 10, the fitting portion 82 is formed in a convexo-concave shape by a protrusion 82A, and is configured to be fitted to the end portion of the inner weather strip 64. Besides, a plate-like covering portion 86 that extends forward with respect to the door is provided at a lower end portion of the fitting portion 82. Also, the covering portion 86 is configured to enter the gap between the door inner panel 62 and the inner weather strip 64 when the sound insulation member 80 is attached to the inner weather strip 64.

The sealing portion 84 is provided at a region that is located behind the fitting portion 82 with respect to the door. The sealing portion 84 is configured to seal the gap between the inner weather strip 64 and the door inner panel 62. Besides, the damping portion 88 and the damping portion 90 are provided outside the sealing portion 84 in the thickness direction of the door. The damping portion 88 and the damping portion 90 constitute a space that substantially assumes the shape of a rectangular parallelepiped, as is the case with the damping portion 28 of the first embodiment of the invention.

According to the sound insulation member 80 of the present embodiment of the invention, an operation and an effect that are similar to those of the sound insulation member 16 of the first embodiment of the invention are achieved. Incidentally, by attaching the sound insulation member 16 of the first embodiment of the invention and the sound insulation member 40 of the second embodiment of the invention to the inner weather strip 14 on the front side door side, and attaching the sound insulation member 60 of the third embodiment of the invention and the sound insulation member 80 of the present embodiment of the invention to the inner weather strip 64 on an a rear side door side, soundinsulating properties can be enhanced to the maximum in comparison with the cases where only one, two or three of the sound insulation members are attached to the inner weather strip(s).

While the sound insulation members according to the first to fourth embodiments of the invention have been described above, it is obvious that the first to fourth embodiments of the invention may be appropriately combined with one another to be used, and can be carried out in various modes within such a range as not to depart from the gist of the invention.

The disclosure of Japanese Patent Application No. 2013-246610 filed on Nov. 28, 2013 is incorporated in the present specification by reference in its entirety.

What is claimed is:

1. A sound insulation member comprising:
   a fitting portion that is fitted into at least one of a door front-side end portion or a door rear-side end portion of an inner weather strip that is disposed at an upper portion of a door inner panel;
   a sealing portion that fills a gap between the inner weather strip and the door inner panel; and
   a covering portion that is provided on the fitting portion and covers a door lower side of the inner weather strip,
   wherein the fitting portion, the sealing portion and the covering portion are integrally formed as a one-piece unitary structure made entirely of a resin material that has an elastic property.

2. The sound insulation member according to claim 1, wherein
   the sealing portion is equipped with a sealing lip that is elastically pressed into contact with an opening edge portion of the door inner panel.

3. The sound insulation member according to claim 1, further comprising:

a tubular damping portion that is surrounded by lateral walls and a bottom wall.

4. A vehicular door structure comprising:

the door inner panel of a vehicle;

the inner weather strip that is disposed at the upper portion of the door inner panel; and the sound insulation member according to claim 1, that is fitted to the door front-side end portion or the door rear-side end portion of the inner weather strip.

\* \* \* \* \*